United States Patent [19]

Lin

[11] Patent Number: 5,289,104
[45] Date of Patent: Feb. 22, 1994

[54] BATTERY CHARGING DEVICE

[76] Inventor: Pi-Chu Lin, No. 157-8, Hu-Tzu Nei, Hu-Nei Li, Chia-Yi City, Taiwan

[21] Appl. No.: 979,565

[22] Filed: Nov. 20, 1992

Related U.S. Application Data

[63] Continuation-in-part of Ser. No. 911,191, Jul. 9, 1992, Pat. No. 5,254,933.

[51] Int. Cl.⁵ .................................................. H02J 7/10
[52] U.S. Cl. .................................................. 320/35
[58] Field of Search .................................. 320/35, 36

[56] References Cited

U.S. PATENT DOCUMENTS

| | | | |
|---|---|---|---|
| 3,911,350 | 10/1975 | Swope | 320/35 X |
| 3,911,351 | 10/1975 | Saslow | 320/35 X |
| 4,297,630 | 10/1981 | Mullersman | 320/35 |
| 4,544,876 | 10/1985 | Bailey et al. | 320/35 X |
| 4,998,056 | 3/1991 | Cole | 320/35 |

Primary Examiner—R. J. Hickey
Attorney, Agent, or Firm—Dinnin & Dunn

[57] ABSTRACT

A battery charging device for charging a rechargeable battery unit includes a step-down unit which receives an external alternating current line voltage input and which reduces the line voltage input to an appropriate level. A rectifier unit receives the reduced line voltage input from the step-down unit and generates a direct current signal to charge the battery unit. A current limiting resistor serially interconnects the rectifier unit and the battery unit. A control unit is in series with the battery unit and includes a temperature switch, an excess current protective device in series with the switch, and a high resistance heating unit connected across the series combination of the switch and the protective device.

1 Claim, 2 Drawing Sheets

BATTERY CHARGING DEVICE

BACKGROUND OF THE INVENTION

1. Field of the Invention

This is a continuation-in-part application of co-pending U.S. patent application Ser. No. 07/911,191, filed on Jul. 9, 1992, now U.S. Pat. No. 5,254,933, by the applicant.

The invention relates to a battery charging device, more particularly to a battery charging device with fast and slow charging capabilities.

2. Description of the Related Art

Portable electrical devices usually require a battery source so as to operate the same. Rechargeable battery units are preferably used in order to reduce the costs incurred by the consumer. Different types of battery charging devices are presently available to charge the battery units.

In order to reduce the charging time while avoiding damage to the battery units, the battery charging device initially operates in a fast charging state until the battery voltage reaches a predetermined value. The battery charging device then automatically switches to a slow charging state in which current flow to the battery unit is minimized so as to prevent damage to the battery units.

FIG. 1 is a schematic electrical circuit diagram of a conventional battery charging device which can automatically switch from a fast charging state to a slow charging state. A transformer (T) receives an external alternating current (AC) line voltage input and reduces the line voltage input to a more appropriate level. The output of the transformer (T) is received by a bridge rectifier unit which comprises four diodes (D1-D4) and which generates a direct current signal to charge a series of battery units (B). The following is a brief description of the operation of the conventional battery charging device:

When the battery charging device is operating in the fast charging state, the direct current signal from the rectifier circuit initially flows through the battery units (B), a diode (D5) and a resistor (R1), thus charging a capacitor (C1). A zener diode (DZ) is reverse biased and has a voltage which is sufficient to trigger a thyristor (SCR) to conduct. Conduction of the thyristor (SCR) causes a large portion of the direct current signal to flow through the battery units (B), a temperature switch (T.S.), a current limiting resistor (R3) and the thyristor (SCR). The temperature switch (T.S.) is in contact with the battery units (B) and monitors the temperature of the battery units (B). Since the temperature of the battery units (B) gradually increases when fast charging is being conducted, the switch (T.S.) eventually opens when the temperature of the battery unit (B) reaches a predetermined value, such as 46° C., thereby indicating the completion of the fast charging operation.

The battery charging device conducts a slow charging operation when the switch (T.S.) is in an open circuit state. The direct current signal from the rectifier circuit initially flows through the battery units (B) and through a current limiting resistor (R5). The resistor (R5) has a resistance (typically 100 Ω) which is much greater than that of the resistor (R3) (typically less than 1 Ω), thus permitting the resistor (R5) to reduce the value of the direct current signal when the battery charging device is in the slow charging state.

The main disadvantage of the above described conventional battery charging device is as follows: Note that the voltage input at the primary winding of the transformer (T1) is unstable and may have high impulse noise present thereat. This can cause a corresponding increase in the current supplied to the battery units (B). The increase in current has little effect on the battery units (B) when the battery charging device is in the slow charging state. However, the increase in current may damage and reduce the service life of the battery units (B) when the battery charging device is in the fast charging state.

SUMMARY OF THE INVENTION

Therefore, the objective of the present invention is to provide a battery charging device which is capable of switching automatically from a fast charging state to a slow charging state upon detection of an undesirable input condition, thereby prolonging the service life of the battery unit.

Accordingly, the battery charging device of the present invention is used to charge a rechargeable battery unit and comprises:

a step-down unit receiving an external alternating current line voltage input and reducing the line voltage input to an appropriate level;

a rectifier unit receiving the reduced line voltage input from the step-down unit and generating a direct current signal to charge the battery unit;

a current limiting resistor serially interconnecting the rectifier unit and the battery unit; and a control unit connected in series with the battery unit and including a temperature switch, an excess current protective device in series with the switch, and a high resistance heating unit connected across the series combination of the switch and the protective device, said switch being closed when the temperature of the battery unit is below a predetermined limit so as to effect fast charging, said switch being opened to permit the direct current signal to flow through the heating unit so as to reduce the value of the direct current signal in order to effect slow charging when the temperature of the battery unit reaches the predetermined limit, said protective device being open-circuited when excessive current flows through the switch while the battery charging device is effecting fast charging, thereby enabling said battery charging device to switch automatically to slow charging.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
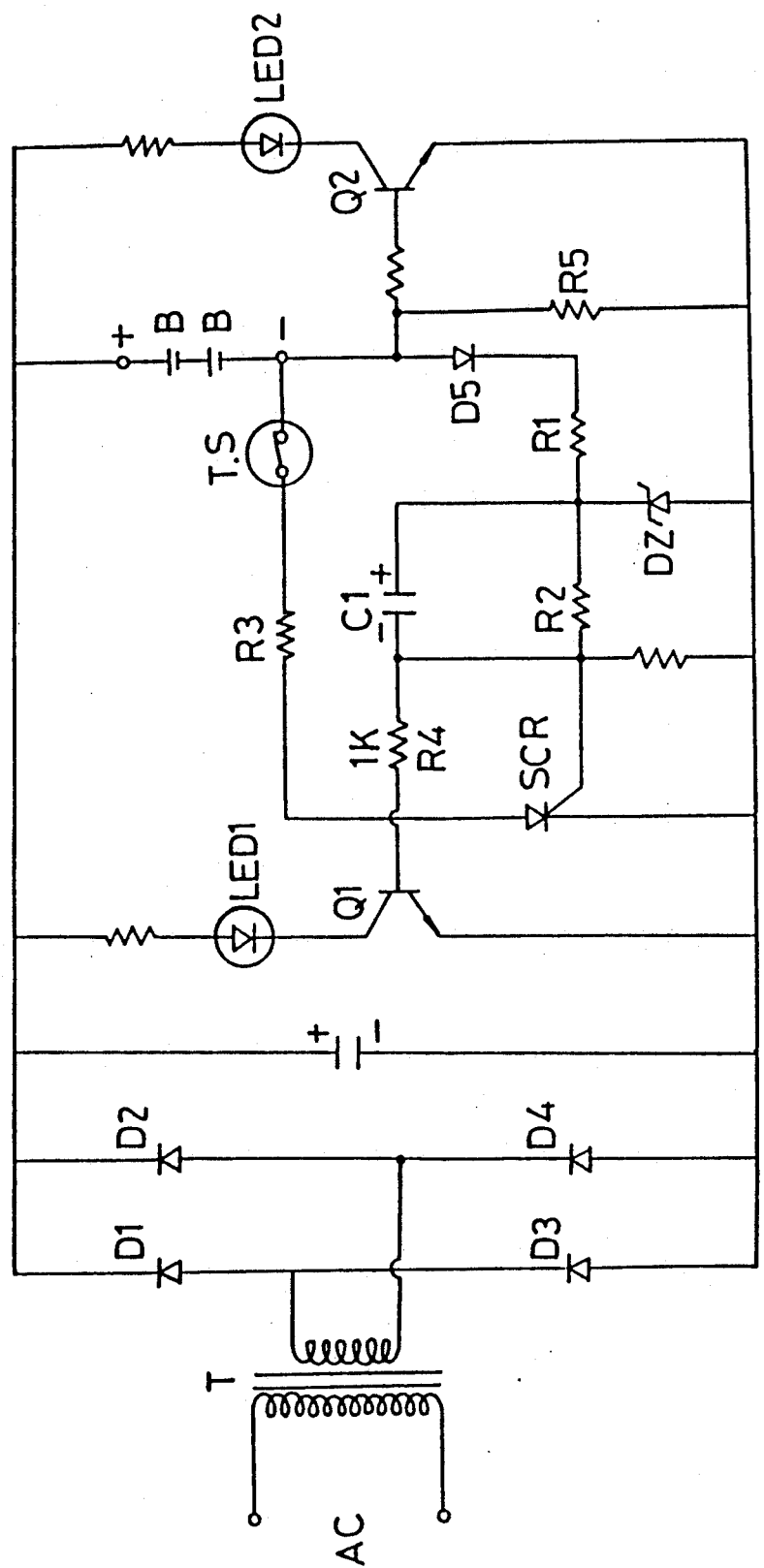
FIG. 1 is a schematic electrical circuit diagram of a conventional battery charging device with fast and slow charging capabilities.
Figure 2:
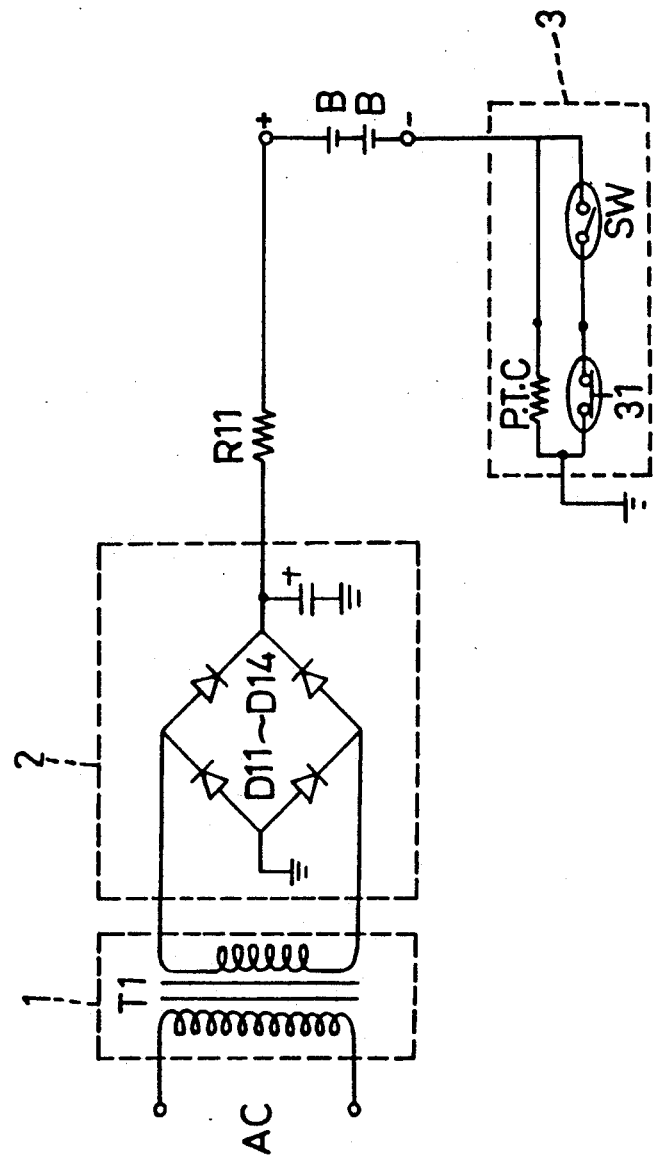
FIG. 2 is a schematic electrical circuit diagram of the preferred embodiment of a battery charging device according to the present invention.

Referring to FIG. 2, the preferred embodiment of a battery charging device according to the present invention is shown to comprise a step-down unit (1), such as a transformer (T1), which receives an external alternating current (AC) line voltage input and which reduces the line voltage input to an appropriate level. The output of the step-down unit (1) is received by a rectifier unit (2). The rectifier unit (2) includes four diodes (D11-D14) which are arranged so as to form a bridge rectifier circuit. The rectifier unit (2) generates a direct current signal which charges a series of battery units (B) via a current limiting resistor (R11). A control unit (3) is serially connected to the battery units (B) and includes a temperature switch (SW), an excess current protective device (31) which is connected in series with the switch (SW), and a high resistance heating unit, such as a positive temperature coefficient thermistor (P.T.C.), which is connected across the series combination of the switch (SW) and the protective device (31).

The following is a description of the operation of the preferred embodiment:

When the battery charging device is operating in the fast charging state, the direct current signal from the rectifier unit (2) has a relatively large value and flows through the resistor (R11), the battery units (B), the switch (SW) and the protective device (31). Since the temperature of the battery units (B) gradually increases when fast charging is being conducted, the switch (SW) eventually opens when the temperature of the battery units (B) reaches a predetermined temperature, such as 46° C., to indicate the termination of the fast charging operation.

When the battery charging device is operating in the slow charging state, the direct current signal from the rectifier unit (2) flows through the resistor (R11), the battery units (B) and the thermistor (P.T.C.). The thermistor (P.T.C.) has a relatively large resistance compared to the resistor (R11), thereby reducing the value of the direct current signal and causing the thermistor (P.T.C.) to generate heat and maintain the temperature of the switch (SW) above 46° C. so as to keep the switch (SW) in the open circuit state when current flows therethrough. The switch (SW) is therefore maintained in the open circuit state and is prevented from closing when the preferred embodiment is operating in the slow charging state.

When an undesirable input condition occurs while the preferred embodiment is operating in the fast charging state, which input condition results in excessive current to the battery units (B), the excessive current flows through the switch (SW) and the protective device (31), thereby open-circuiting the protective device (31) so as to enable the battery charging device to switch automatically to the slow charging state.

It has thus been shown that the battery charging device of the present invention is capable of switching automatically from the fast charging state to the slow charging state upon detection of an undesirable input condition, thereby prolonging the service life of the battery unit.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A battery charging device for charging a rechargeable battery unit, comprising:

a step-down unit receiving an external alternating current line voltage input and reducing the line voltage input to an appropriate level;

a rectifier unit receiving the reduced line voltage input from said step-down unit and generating a direct current signal to charge the battery unit;

a current limiting resistor serially interconnecting said rectifier unit and the battery unit; and a control unit connected in series with said battery unit and including a temperature switch, an excess current protective device in series with said switch, and a high resistance heating unit connected across the series combination of said switch and said protective device, said switch being thermally connected with the battery unit, said heating unit is a positive temperature coefficient thermistor, said switch being closed when the temperature of the battery unit is below a predetermined limit so as to effect fast charging, said switch being opened to permit said direct current signal to flow through said heating unit so as to reduce the value of said direct current signal in order to effect slow charging when the temperature of the battery unit reaches the predetermined limit, said protective device being open-circuited when excessive current flows through said switch while said battery charging device is effecting fast charging, thereby enabling said battery charging device to switch automatically to slow charging.

* * * * *